US008457954B2

(12) United States Patent
Takeuchi et al.

(10) Patent No.: US 8,457,954 B2
(45) Date of Patent: Jun. 4, 2013

(54) SOUND QUALITY CONTROL APPARATUS AND SOUND QUALITY CONTROL METHOD (75) Inventors: Hirokazu Takeuchi, Machida (JP); Hiroshi Yonekubo, Suginami-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 228 days.

(21) Appl. No.: 13/096,813

(22) Filed: Apr. 28, 2011

(65) Prior Publication Data
US 2012/0029913 A1 Feb. 2, 2012

(30) Foreign Application Priority Data

Jul. 28, 2010 (JP) ................................. 2010-169638

(51) Int. Cl.
*G10L 19/14* (2006.01)
*G10L 21/02* (2006.01)
*G10L 21/00* (2006.01)
*G10L 11/00* (2006.01)
*H03G 3/00* (2006.01)

(52) U.S. Cl.
USPC ............ 704/224; 704/228; 704/270; 381/107

(58) Field of Classification Search
None
See application file for complete search history.

(56) References Cited

U.S. PATENT DOCUMENTS

| | | | | |
|---|---|---|---|---|
| 5,375,188 A * | 12/1994 | Serikawa et al. | ............ | 704/215 |
| 5,586,193 A * | 12/1996 | Ichise et al. | ............ | 381/106 |
| 6,633,841 B1 * | 10/2003 | Thyssen et al. | ............ | 704/233 |
| 6,820,054 B2 * | 11/2004 | Erell et al. | ............ | 704/233 |
| 6,914,988 B2 * | 7/2005 | Irwan et al. | ............ | 381/22 |
| 7,283,879 B2 * | 10/2007 | Zeevi et al. | ............ | 700/94 |
| 8,195,451 B2 * | 6/2012 | Toguri | ............ | 704/211 |
| 8,340,964 B2 * | 12/2012 | Konchitsky et al. | ........... | 704/233 |
| 2008/0033583 A1 * | 2/2008 | Zopf | ............ | 700/94 |
| 2009/0296961 A1 | 12/2009 | Takeuchi et al. | | |
| 2010/0004928 A1 | 1/2010 | Yonekubo et al. | | |
| 2010/0332237 A1 | 12/2010 | Takeuchi | | |
| 2011/0071837 A1 | 3/2011 | Yonekubo et al. | | |

FOREIGN PATENT DOCUMENTS

| | | |
|---|---|---|
| JP | 07-013586 | 1/1995 |
| JP | 2007-171289 | 7/2007 |
| JP | 2009-288669 | 12/2009 |
| JP | 2010-014960 | 1/2010 |
| JP | 2011015067 | 1/2011 |
| JP | 2011065093 | 3/2011 |

OTHER PUBLICATIONS

Lavner et al., "A Decision-Tree-Based Algorithm for Speech/Music Classification and Segmentation", EURASIP Journal on Audio, Speech, and Music Processing, 2009.*

* cited by examiner

*Primary Examiner* — Brian Albertalli
(74) *Attorney, Agent, or Firm* — Blakely, Sokoloff, Taylor & Zafman LLP (57) ABSTRACT

According to one embodiment, there is provided a sound quality control apparatus, including: a characteristic parameter extractor; a speech score calculator; a music score calculator; a power value acquisition module; a first storage configured to store speech scores and music scores; a second storage configured to store power values; a power-based score corrector configured to correct a current music score or a current speech score based on a first comparison result between a current power value and past power values, a second comparison result between the current music score and past music scores and a third comparison result between the current speech score and past speech scores; and a sound quality controller configured to perform a sound quality control by using at least one of the speech score and the music score corrected by the power-based score corrector.

8 Claims, 6 Drawing Sheets

SOUND QUALITY CONTROL APPARATUS AND SOUND QUALITY CONTROL METHOD

CROSS-REFERENCE TO RELATED APPLICATION(S)

This application is based upon and claims the benefit of priority from Japanese Patent Application No. 2010-169638, filed on Jul. 28, 2010, the entire contents of which are incorporated herein by reference.

FIELD

Embodiments described herein relate generally to a sound quality control apparatus and a sound quality control method.

BACKGROUND

For example, in a broadcast receiver for receiving a television broadcast or an information reproducer for reproducing recorded information from an information recording medium, when reproducing an audio signal from the received broadcast signal or the read-out signal, a sound quantity control process is applied to the audio signal to improve sound quality.

Contents of the sound quality control process applied to the audio signal is changed according to whether the audio signal is a speech signal such as human speaking voice or a music (non-speech) signal such as a musical composition. Generally, sound quality in a speech signal can be improved by emphasizing and clarifying center localizing signal components in a talk scene, a live sports broadcast, etc., whereas sound quality in a music signal can be improved by emphasizing a stereophonic effect and enlarging the soundspace.

Therefore, whether the acquired audio signal is a speech signal or a music signal is determined, and then, a corresponding sound quality control process is applied to the audio signal in accordance with the determination result. For example, in JP-H07-013586-A, the number of zero-crossing points, power change, etc. in an input acoustic signal are analyzed to determine the acoustic signal as one of the three types, i.e. "speech", "non-speech (music)" and "indefinite", and frequency characteristic for the acoustic signal is controlled stepwise based on the determination result.

This control method uses an equalizer having stepwise different band emphasizing characteristics in a range of from frequency characteristic for emphasizing a speech band for "speech" to flat frequency characteristic (wider band than the speech band only) including a non-speech band for "non-speech (music)" in order to obtain stepwise transition of frequency characteristic based on the determination result so that the frequency characteristic is changed to speech characteristic for "speech" or flat characteristic for "non-speech (music)" or the previous determination is kept for "indefinite".

However, in an ordinary broadcast program, a scene explicitly composed of only speech or of only non-speech (music) is rare. Accordingly, a mixed signal is apt to be judged to be "indefinite", or previous misjudgment is apt to be kept to continuously cause mistaken sound quality control. Moreover, although a low power signal section such as background noise, BGM, etc. is generally not important, since determination is not made in accordance with the signal power value, followability of sound quality control to a change in signal characteristic after judgment when the ordinary judgment is applied to such low power signal section.

BRIEF DESCRIPTION OF THE DRAWINGS

A general architecture that implements the various features of the present invention will now be described with reference to the drawings. The drawings and the associated descriptions are provided to illustrate embodiments of the present invention and not to limit the scope of the present invention.

DETAILED DESCRIPTION

In general, according to one embodiment, there is provided a sound quality control apparatus, including: a characteristic parameter extractor configured to analyze a characteristic of an input audio signal to extract a characteristic parameter; a speech score calculator configured to calculate a speech score indicating similarity to a speech signal characteristic, from the extracted characteristic parameter; a music score calculator configured to calculate a music score indicating similarity to a music signal characteristic, from the extracted characteristic parameter; a power value acquisition module configured to acquire a power of the input audio signal as a power value; a first storage configured to store speech scores and music scores in past predetermined sections; a second storage configured to store power values in the past predetermined sections; a power-based score corrector configured to correct a current music score or a current speech score based on a first comparison result between a current power value and past power values, a second comparison result between the current music score and past music scores and a third comparison result between the current speech score and past speech scores; and a sound quality controller configured to perform a sound quality control for the input audio signal by using at least one of the speech score and the music score corrected by the power-based score corrector.

An embodiment will be described below.

First Embodiment

A first embodiment will be described with reference to FIGS. 1 to 6.

Figure 1:
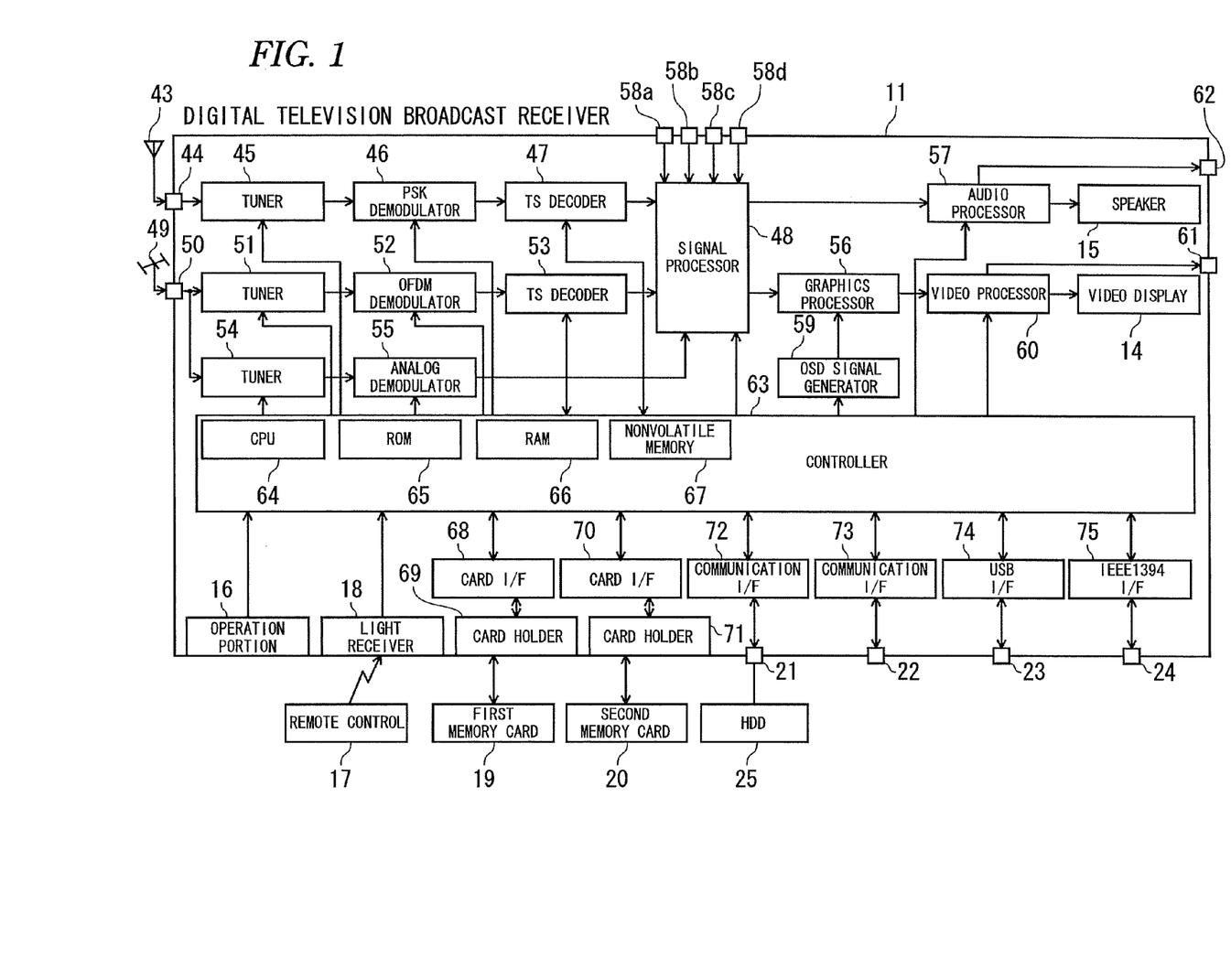
FIG. 1 illustrates a system configuration of an embodiment.

FIG. 1 illustrates a system configuration of the first embodiment. FIG. 1 illustrates a signal processing system in a digital television broadcast receiver 11 according to the first embodiment. That is, a satellite digital television broadcast signal received through a BS/CS (broadcasting satellite/communication satellite) digital broadcast reception antenna 43 is fed to a satellite digital broadcast tuner 45 through an input terminal 44, so that a broadcast signal of a desired channel is selected.

The broadcast signal selected by the tuner 45 is fed to a PSK (phase shift keying) demodulator 46 and a TS (transport stream) decoder 47 successively so as to be demodulated into digital video and audio signals. The digital video and audio signals thus demodulated are outputted to a signal processor 48.

A terrestrial digital television broadcast signal received through a terrestrial broadcast reception antenna 49 is fed to a terrestrial digital broadcast tuner 51 through an input terminal 50, so that a broadcast signal of a desired channel is selected.

For example, in Japan, the broadcast signal selected by the tuner 51 is fed to an OFDM (orthogonal frequency division multiplexing) demodulator 52 and a TS decoder 53 successively so as to be demodulated into digital video and audio signals. The digital video and audio signals thus demodulated are outputted to the signal processor 48.

A terrestrial analog television broadcast signal received through the terrestrial broadcast reception antenna 49 is fed to a terrestrial analog broadcast tuner 54 through the input terminal 50, so that a broadcast signal of a desired channel is selected. The broadcast signal selected by the tuner 54 is fed to an analog demodulator 55 so as to be demodulated into analog video and audio singles. Then, the analog video and audio signals thus demodulated are outputted to the signal processor 48.

On this occasion, the signal processor 48 selectively applies predetermined digital signal processing to the digital video and audio signals given from the TS decoders 47 and 53, and outputs the processed video and audio signals to a graphics processor 56 and an audio processor 57 respectively.

A plurality (four in FIG. 1) of input terminals 58a, 58b, 58c and 58d are connected to the signal processor 48. These input terminals 58a to 58d permit analog video and audio signals to be inputted from the outside of the digital television broadcast receiver 11 respectively.

The signal processor 48 selectively digitizes the analog video and audio signals given from the analog demodulator 55 and the input terminals 58a to 58d respectively, applies predetermined digital signal processing to the digitized video and audio signals, and outputs the processed video and audio signals to the graphics processor 56 and the audio processor 57.

The graphics processor 56 has a function of superposing an OSD signal generated by an OSD (on screen display) signal generator 59 on the digital video signal given from the signal processor 48, and outputting the superposed signal. The graphics processor 56 can selectively output either the output video signal of the signal processor 48 or the output OSD signal of the OSD signal generator 59, and can output the two output signals which are combined so that each output signal forms a half of a screen.

The digital video signal outputted from the graphics processor 56 is fed to a video processor 60. The video processor 60 converts the input digital video signal into an analog video signal of a format allowed to be displayed on the video display 14, and then outputs the analog video signal to the video display 14 to display video while leading the analog video signal to the outside through an output terminal 61.

The audio processor 57 applies a sound quality correction process (which will be described later) to the input digital audio signal, and then converts the digital audio signal into an analog audio signal of a format allowed to be reproduced by the speaker 15. The analog audio signal is outputted to the speaker 15 to be used for audio playback while being led to the outside through an output terminal 62. The speaker 15 serves as an output module which outputs the sound quantity-controlled output audio signal.

On this occasion, all operations (inclusive of the aforementioned various receiving operations) of the digital television broadcast receiver 11 are generally controlled by a controller 63. The controller 63 has a built-in CPU (central processing unit) 64, which receives operation information given from the operation portion 16 or operation information sent out from a remote controller 17 and received by the light receiver 18, and controls respective elements to reflect the operation.

In this case, the controller 63 mainly uses an ROM (read only memory) 65 which stores control programs to be executed by the CPU 64, an RAM (random access memory) 66 which provides a work area to the CPU 64, and a nonvolatile memory 67 which stores various kinds of setting information, control information, etc.

The controller 63 is connected to a card holder 69 in which a first memory card 19 can be mounted, through a card I/F (interface) 68. Accordingly, the controller 63 can exchange information with the first memory card 19 mounted in the card holder 69, through the card I/F 68.

The controller 63 is further connected to a card holder 71 in which a second memory card 20 can be mounted, through a card I/F 70. Accordingly, the controller 63 can exchange information with the second memory card 20 mounted in the card holder 71, through the card I/F 70.

The controller 63 is further connected to a first LAN terminal 21 through a communication I/F 72. Accordingly, the controller 63 can exchange information with an LAN-compatible HDD 25 connected to the first LAN terminal 21, through the communication I/F 72. In this case, the controller 63 has a DHCP (dynamic host configuration protocol) server function which allocates an IP (internet protocol) address to the LAN-compatible HDD 25 connected to the first LAN terminal 21 in order to control the LAN-compatible HDD 25.

The controller 63 is further connected to a second LAN terminal 22 through a communication I/F 73. Accordingly, the controller 63 can exchange information with each device connected to the second LAN terminal 22, through the communication I/F 73.

The controller 63 is further connected to a USB terminal 23 through a USB I/F 74. Accordingly, the controller 63 can exchange information with each device connected to the USB terminal 23, through the USB I/F 74.

The controller 63 is further connected to an IEEE1394 terminal 24 through an IEEE1394 I/F 75. Accordingly, the controller 63 can exchange information with each device connected to the IEEE1394 terminal 24, through the IEEE1394 I/F 75.

An example for audio signal feature detection will be described below.

Figure 2:
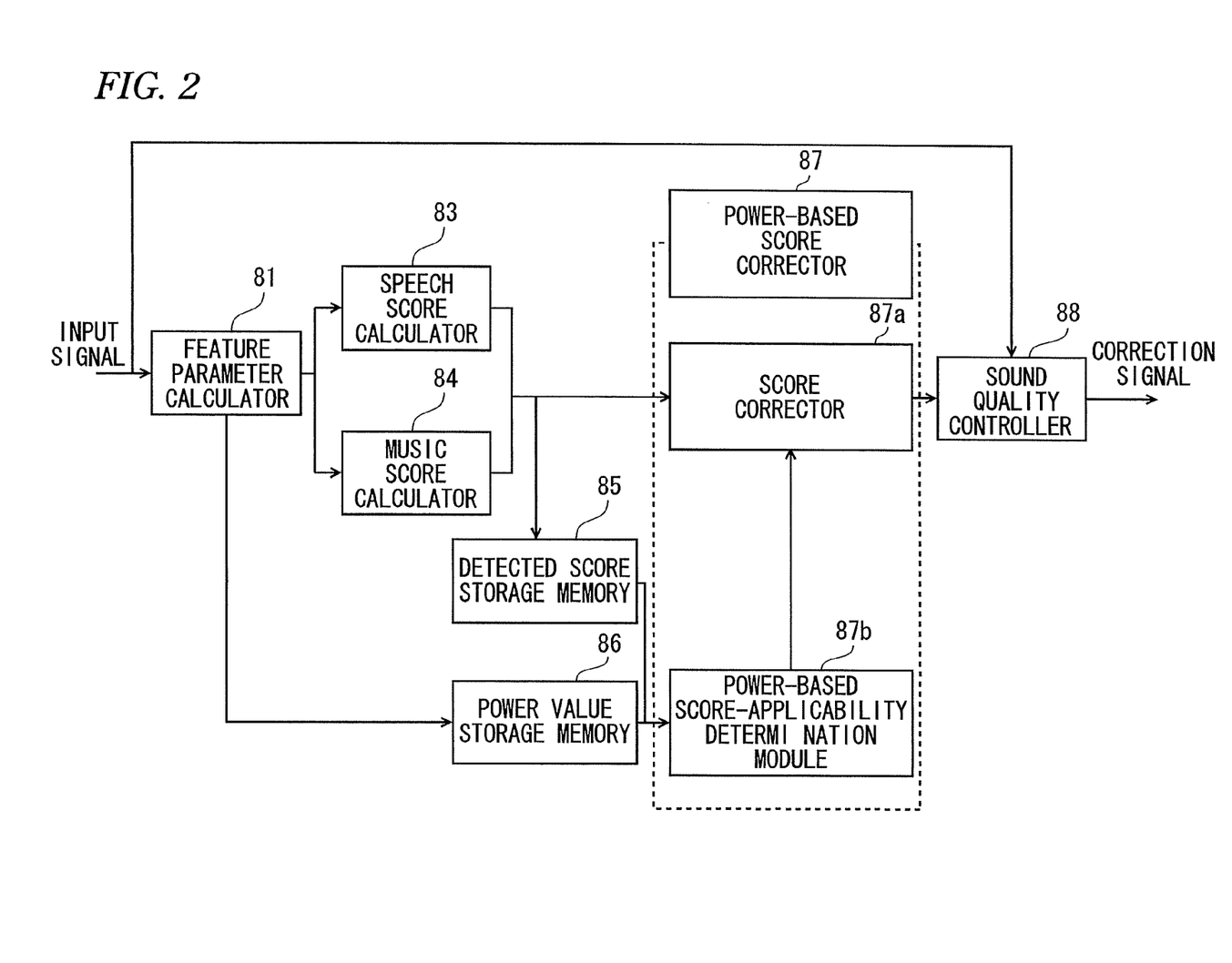
FIG. 2 illustrates a functional configuration of a sound quality control apparatus according to this embodiment.

FIG. 2 illustrates a functional configuration of a sound quality control apparatus which is provided in the audio processor 57 for performing a sound quality control process adaptively. This apparatus includes a feature parameter calculator 81, a speech score calculator 83, a music score calculator 84, a detected score storage memory 85, a power value storage memory 86, a score corrector 87a, a power-based score-applicability determination module 87b, and a sound quality controller 88. The speaker 15 can be used as an output module which outputs an audio signal outputted from the sound quality controller 88. This apparatus scores the degree of speech and the degree of music based on respective feature parameter values in determination as to whether the input signal having a mixture signal or a background sound (such as a handclap, a shout of joy, BGM, etc.) superposed on the input audio signal is speech or music, performs power value-interlock score correction in accordance with the power value and detected scores of a past input signal when the signal power is low and each detected score is high, and performs sound quality control suitable for a signal characteristic based on the corrected scores. In this manner, sound quality control suitable for the signal characteristic of the input signal can be achieved, and followability of sound quality control to speech can be improved when the music score increases in excessive response to weak BGM or background sound in a gap in a conversation in a drama or the like so that the signal characteristic is switched (to a scene in a conversation etc.) in accordance with the increase of the music score.

The feature parameter calculator 81 is a so-called characteristic parameter extractor which cuts an input audio signal into frames per hundreds of msec, divides each of the frames into sub-frames of the order of tens of msec, calculates a power value, a zero-crossing frequency and a left/right (LR) signal power ratio for stereo signal in accordance with each sub-frame, calculates statistical quantities (average/variance/maximum/minimum, etc.) of these in accordance with each frame, and extracts the statistical quantities as time region feature parameters. The feature parameter calculator 81 further performs discrete Fourier transform for each signal unit corresponding to the sub-frame to make conversion into a frequency region signal. The feature parameter calculator 81 calculates spectral variation, MFCC (Mel-Frequency Cepstrum Coefficient) variation and the degree of energy concentration of a specific frequency band (a base component of an instrument) based on the frequency region signal, calculates statistical quantities (average/variance/maximum/minimum, etc.) of these in accordance with each frame, and extracts the statistical quantities as frequency region feature parameters. The speech score calculator 83 and the music score calculator 84 calculate a speech score SS and a music score SM indicating whether the input signal is close to a speech signal characteristic or to a music (musical composition) signal characteristic based on the time region and frequency region feature parameters, in the same manner as in patent applications (Japanese Patent Application Nos. P2009-156004 and P2009-217941) which have been applied by the present inventors. For calculation of the respective scores, a speech/music discrimination score S1 is first calculated by linear addition of a feature parameter set xi by a weight coefficient Ai as represented by the following expression. This is a score which performs linear discrimination so that the score takes a positive value when the degree of music is higher than the degree of speech, but the score takes a negative value when the degree of speech is higher than the degree of music.

$$S1 = A0 + \sum_{i=1}^{N1} Ai \cdot xi \qquad \text{(expression 1)}$$

N1 is a number of characteristic parameters for speech/music discrimination. The weight coefficient Ai is determined in the condition that lots of known prepared speech signal data and music signal data are offline-learned as reference data in advance. As for learning, the coefficient is determined so that error of the speech/music discrimination score S1 from a reference score taking 1.0 for music but −1.0 for speech is minimized for all reference data.

A background sound/music discrimination score S2 is further calculated for discriminating between background sound and music. This score S2 is calculated as weighted addition of feature parameters in the same manner as the speech/music discrimination score S1 but a characteristic parameter indicating the degree of energy concentration of a base component is added newly for discriminating between background sound and music. The background sound/music discrimination score S2 is a score which performs linear discrimination so that the score S2 takes a positive value when the degree of music is higher than the degree of background sound, but the score S2 takes a negative value when the degree of background sound is higher than the degree of music.

$$S2 = B0 + \sum_{i=1}^{N2} Bi \cdot yi \qquad \text{(expression 2)}$$

Figure 3:
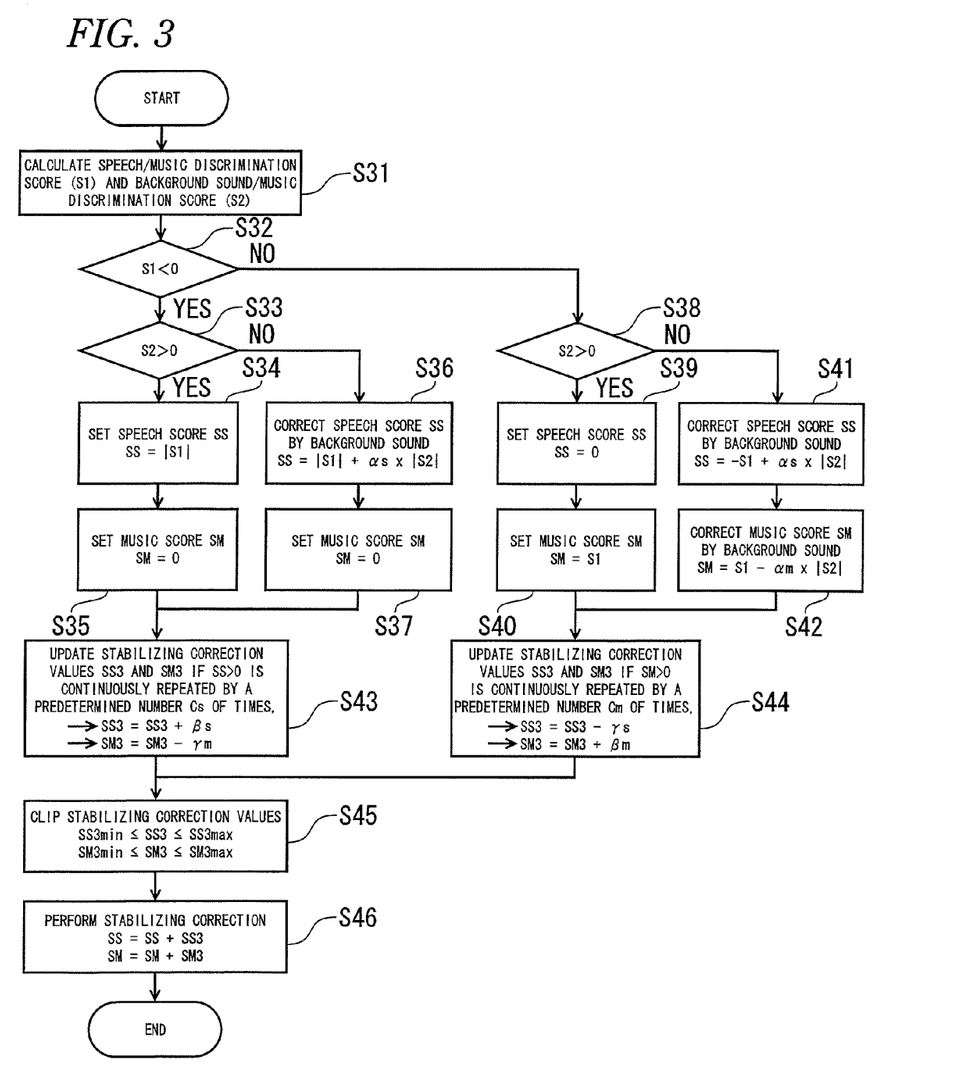
FIG. 3 is a flow chart illustrating a speech score and music score calculation process in this embodiment.

N2 is a number of characteristic parameters for background sound/music discrimination. The weight coefficient Bi is determined in the condition that lots of known prepared background sound signal data and music signal data are offline-learned as reference data in advance in the same manner as the speech/music discrimination. A speech score SS and a music score SM are calculated as scores according to each sound type through a background sound correction and stabilizing process as shown in FIG. 3 in the same manner as in the filed patent applications based on the scores S1 and S2. The speech score SS and the music score SM are calculated based on the speech/music discrimination score S1 and the background sound/music discrimination score S2.

In FIG. 3, score calculators first calculate the scores S1 and S2 respectively (step S31). Successively, background sound correction is performed by the score corrector 87a as follows. When S1<0 is true (the input signal is close to speech rather than music, Yes in step S32) and S2>0 is true (the input signal is close to music rather than background sound, Yes in step S33), the speech score SS is set to be equal to an absolute value |S1| because the speech/music discrimination score S1 takes a negative value (step S34), and the music score SM is set to be zero because the input signal is close to a speech signal characteristic (step S35). When S1<0 is true (the input signal is close to speech rather than music, Yes in step S32) but S2>0 is false (the input signal is close to background sound rather than music, No in step S33), the speech score SS is corrected by αs×|S2| in consideration of a speech component contained in background sound in addition to the absolute value |S1| because S1 takes a negative value (step S36), and the music score SM is set to be zero because the input signal is close to a speech signal characteristic (step S37).

When S1<0 is false (the input signal is close to music rather than speech, No in step S32) but S2>0 is true (the input signal is close to music rather than background sound, Yes in step S38), the speech score SS is set to be zero because the input signal is close to a music signal characteristic (step S39), and the music score SM is set to be equal to S1 corresponding to the degree of music signal (step S40). When S1<0 is false (the input signal is close to music rather than speech, No in step S32) and S2>0 is false (the input signal is close to background sound rather than music, No in step S38), the speech score SS is corrected by αs×|S2| in consideration of a speech component contained in background sound in addition to −S1 which is a score corresponding to the degree of speech (step S41), and the music score SM is corrected by subtraction of αm×|S2| from S1 corresponding to the degree of music signal in consideration of the degree of background sound (step S42).

Stabilizing correction is performed by addition of SS3 and SM3 which are parameters for correction in accordance with continuity of the speech score SS or music score SM obtained by background sound correction and which take initial values of zero.

For example, when SS>0 is repeated by the predetermined number Cs of times in a frame continued after the step S35 or S37, a predetermined positive value βs is added to SS3 to make SS3 proper, and a predetermined positive value γm is subtracted from SM3 to make SM3 proper (step S43). When SM>0 is repeated by the predetermined number Cm of times in a frame continued after the step S40 or S41, γs is subtracted from SS3, and βm is added to SM3 (step S44).

Then, the score corrector 87a performs a clipping process so that each of the stabilizing parameters SS3 and SM3 generated in the step S43 or S44 ranges between a predetermined minimum S and a predetermined maximum in order to prevent excessive correction based on the stabilizing parameters SS3 and SM3 (step S45).

Finally, stabilizing correction based on SS3 and SM3 is performed (step S46), and an average (moving average or the like) of scores in past frames is calculated as a smoothened score if necessary.

Referring back to FIG. 2, the power value storage memory 86 holds the power value obtained in the calculation process of the feature parameter calculator 81 in accordance with each frame of the input signal, over past N frames. The detected score storage memory 85 holds the detected scores obtained by the speech score calculator 83 and the music score calculator 84, over past N frames. The power-based score corrector 87 has a score corrector 87a, and a power-based score-applicability determination module 87b. The power-based score-applicability determination module 87b determines whether the detected scores in the current frame are to be subjected to power value-interlock score correction based on information of the power value storage memory 86 and the detected score storage memory 85. The score corrector 87a corrects the scores based on the information in accordance with the determination result. The corrected detected scores in accordance with each sound type are outputted to the sound quality controller 88 if necessary. Details of processing performed by the power-based score corrector 87 will be described later with reference to another drawing. The sound quality controller 88 controls the degree of sound quality control for speech or music in the same manner as in the filed patent applications in accordance with the speech score and the music score to thereby achieve optimal sound quality control for a signal characteristic of contents.

Figure 4:
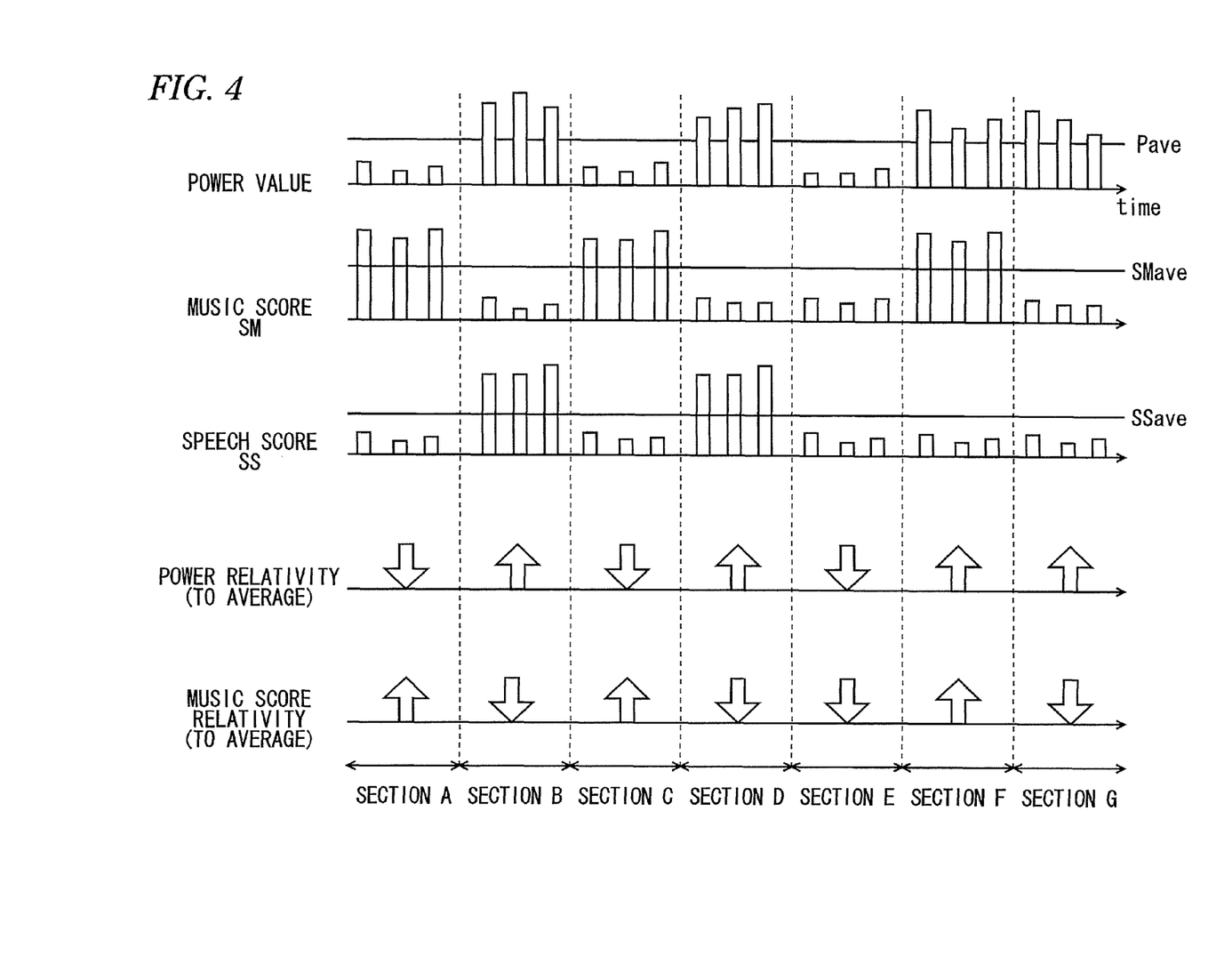
FIG. 4 illustrates a relation between power value and detected score in this embodiment.

FIG. 4 shows a power value concerned with a signal section (frames), scores according to each sound type and relations to averages thereof in time series. For example, in a scene (section B or D) of a conversion, a curbside interview or the like in a drama, a movie or the like, similarity to a speech signal is high during actual speaking so that the speech score outputted from the speech score calculator 83 is high and the signal power value is also high. The bar chart in FIG. 4 shows scores and a power value in accordance with each frame. Although each signal section is actually composed of a larger number of frames, the number of frames is reduced for the sake of expression of FIG. 4. On the other hand, in a scene (section A or C) where weak BGM runs when there is no speech in a gap of a conversation or where daily life noise or crowded street noise is present as a background, the music score calculator 84 may output a high music score regardless of the power value if the signal power value is low but the input signal is similar to a music signal. In such a case, the music score may become high at a leading portion of the following speech (section B or D) because of the influence of delay at the time of score calculation or a smoothening process as an after-stage, so that a bad influence may be given to sound quality control in accordance with the music score consequently. For visualization such as score display, a difference from a subjective image may be felt if the music score is high though the volume of the audio signal currently played back is low (the power value is low). In another music scene (section F), there is no problem because both power value and music score are high. In a noisy scene (section E or G) where both a music signal and a speech signal have low similarities, there is no problem because both scores are low. In the aforementioned method in which a high music score in a section (e.g. section C) as a gap of speech is scaled simply in accordance with a power value, increase in score in a section of a low power value can be suppressed but increase in music score in a speech section (e.g. section A or C) of a high power value is caused relatively or the music score varies frequently according to the power value in a music section or the like, undesirably. Therefore, in the method proposed in the embodiment, only the aforementioned section of low power value and high music score is controlled to correct each score to an appropriate score while notice is paid to past score determination in addition to the power value.

Figure 5:
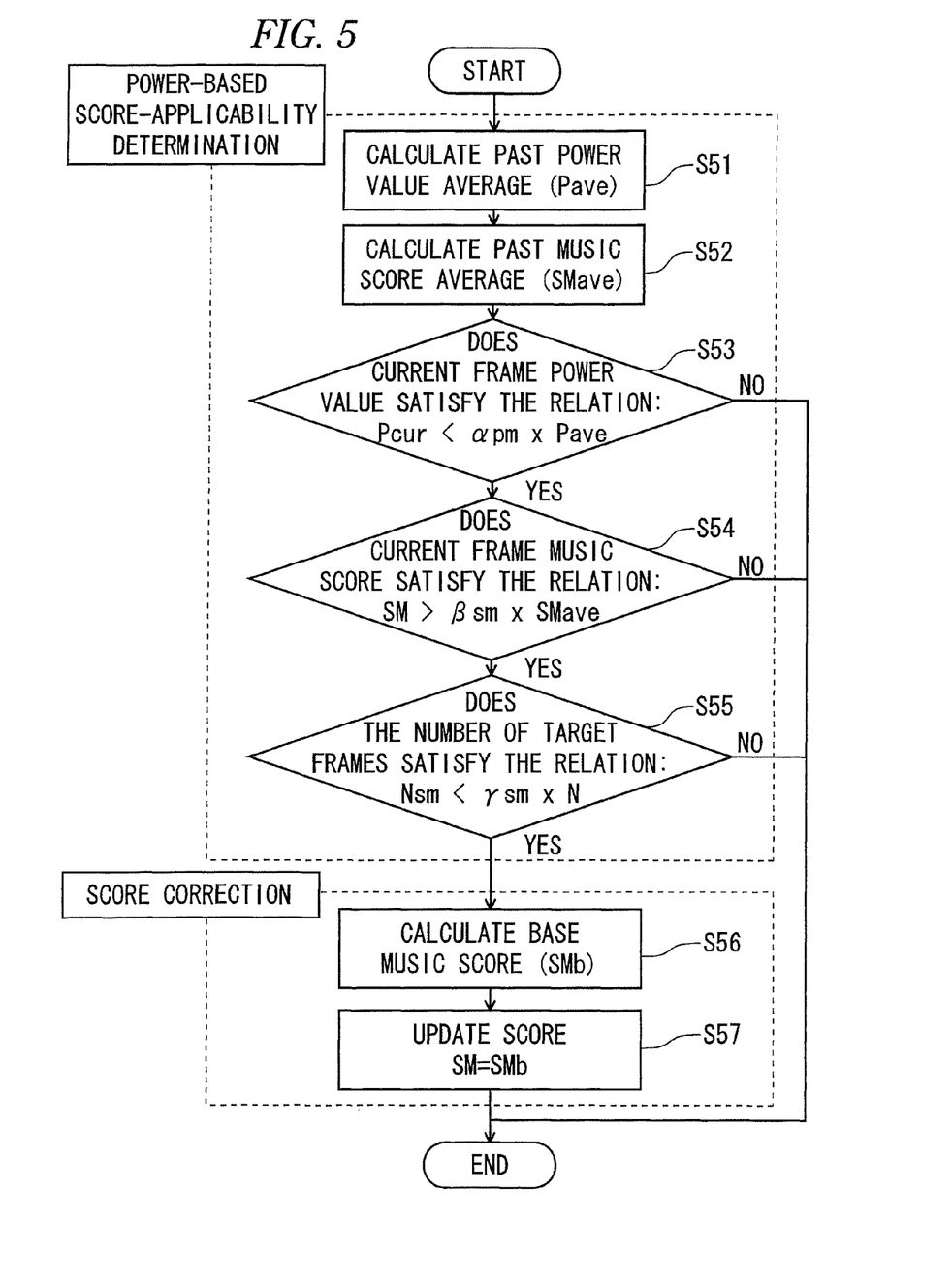
FIG. 5 is a flow chart illustrating a power-based score correction process (music) in this embodiment.

FIG. 5 shows a flow of power-based score correction processing for correcting the music score to an appropriate score in accordance with information of past power values and detected scores (music) in connection with the situation shown in FIG. 4. First, in power-based score-applicability determination as a first half portion, the power-based score-applicability determination module 87b calculates a power average value Pave of past N frames from the power value storage memory 86 which stores a power value per frame obtained by processing performed by the feature parameter calculator 81 (step S51). Then, the power-based score-applicability determination module 87b calculates a music score average value SMave of past N frames from the detected score storage memory 85 which stores music scores outputted from the music score calculator 84 (step S52). Based on these values and a power value Pcur and a music score SM of the current frame, the power-based scare-applicability determination module 87b determines successively whether the current frame is to be subjected to score correction, as follows. When the condition is satisfied, the next step is executed.

First, the power value Pcur of the current frame is compared with Pave to check whether Pcur<αpm×Pave is true, that is, whether the power of the current frame is lower than that of the past signal (step S53). Here, αpm is a coefficient which has a value not larger than 1.0 and giving a margin to the average and which is provided for determining a threshold. When the condition is satisfied, a candidate for score correction is set. When the condition is not satisfied, processing is terminated without score correction. Then, the music score SM of the current frame is compared with SMave to check whether SM>βsm×SMave is true, that is, whether the music score of the current frame is higher than that of the past signal (step S54). Here, βsm is a coefficient which has a value not larger than 1.0 and giving a margin to the average and which is provided for determining a threshold. When the condition is satisfied, a candidate for score correction is set. When the condition is not satisfied, processing is terminated without score correction.

These determination conditions are shown as power relation (to average) and music score relation (to average) in FIG. 4. In FIG. 4, the condition of a down arrow (lower than the average) in the former and an up arrow (higher than the average) in the latter indicates the section A or C. Further, a ratio of the number Nsm of corresponding frames in sections of past N frames is checked based on whether Nsm>γsm×N is true (step S55). Here, γsm is a coefficient which is a threshold indicating the ratio of corresponding frames and which is not larger than 1.0. This is a condition for relaxing correction of reducing the music score by mistake at temporary volume reduction when both power value and music score are high in almost music sections etc. When the condition is satisfied, a candidate for score correction is set. When the condition is not satisfied, processing is terminated without score correction. Each frame satisfying the condition is subjected to a score correction process of the score corrector 87a as a second half portion in FIG. 5 as follows.

First, a base music score SMb is calculated to determine a score value to be corrected (step S56). The base music score SMb is calculated as an average score of frames satisfying SMb$\beta \leq$ smb×SMave in past N frames so that the base music score SMb is set as a value based on the score of a low music score section such as speech, noise, etc. Here, $\beta$smb is a value which is not larger than 1.0 and which gives a margin to the average. Then, the music score SM is updated to the correction value (step S57). Although FIG. 5 shows the case where SMb is directly used as the correction value, it may be used a method which uses a predetermined fixed low score value, a past nearest value not larger than SMb or a value (which is set to zero if the value after subtraction is not larger than zero) obtained by subtracting the correction value so that SM is set to be not larger than a rated value.

Figure 6:
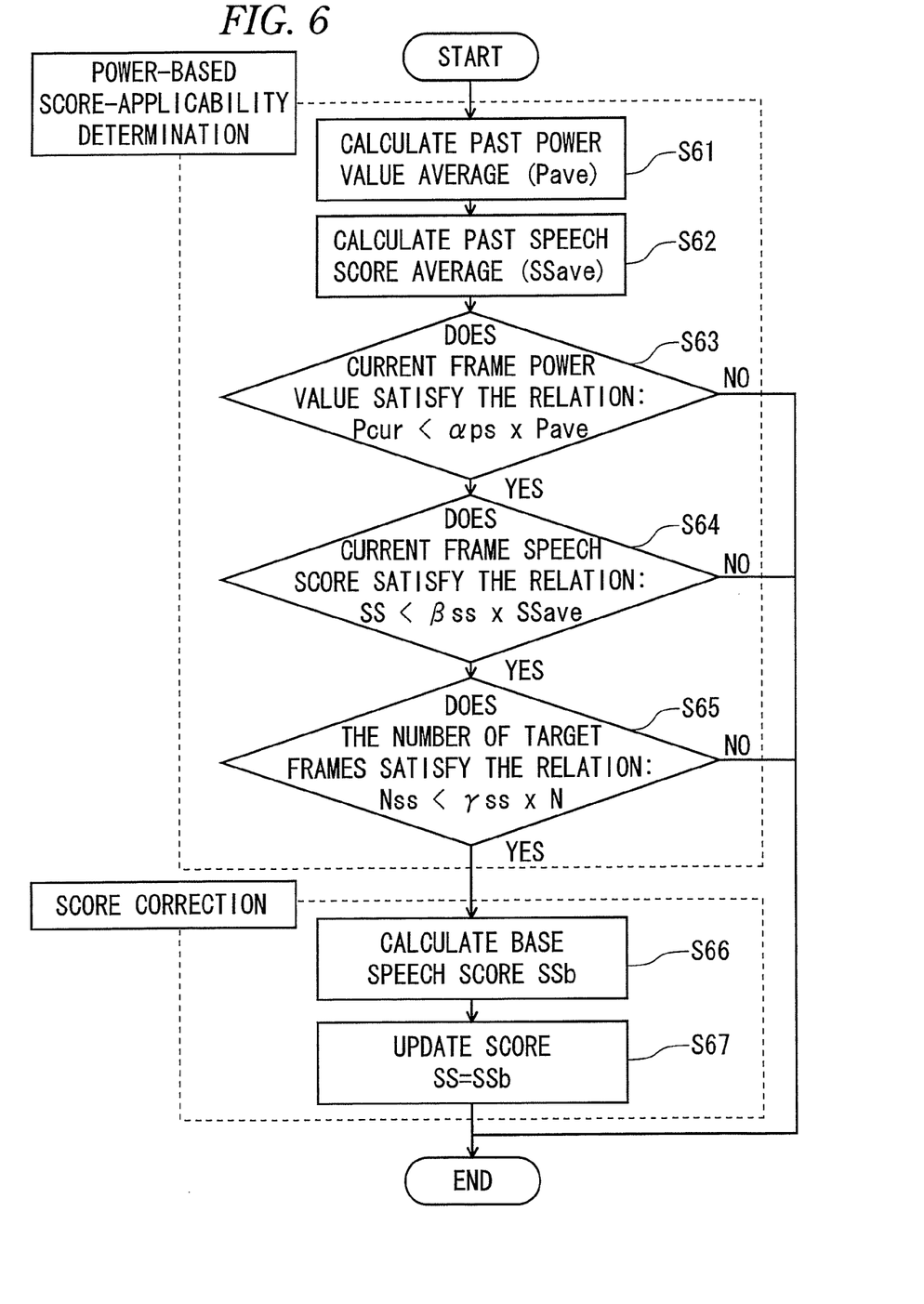
FIG. 6 is a flow chart illustrating a power-based score correction process (speech) in this embodiment.

FIG. 6 shows a flow of power-based score correction processing concerned with the speech score. Although FIG. 5 shows score correction concerned with the music score, correction of keeping the score in consideration of continuity of sound quality control for a short time (low power value) in a speech section such as speaking is suitable for speech because such a phenomenon that the speech score becomes high in a section of low power hardly occurs in terms of a signal characteristic of speech. Therefore, the following score correction is applied to the speech score.

First, in power-based score-applicability determination as a first half portion of FIG. 6, the power-based score-applicability determination module 87b calculates a power average value Pave of past N frames in the same manner as in FIG. 5 (step S61). Then, the power-based score-applicability determination module 87b calculates a speech score average SSave of past N frames from the detected score storage memory 85 which stores speech scores outputted from the speech score calculator 83 (step S62). The power-based score-applicability determination module 87b determines whether the current frame is to be subjected to score correction, based on these values and a power value Pcur and a speech score SS of the current frame, successively. When the condition is satisfied, the next step is executed.

First, the power value Pcur of the current frame is compared with Pave to check whether Pcur<$\alpha$ps×Pave is true, that is, whether the power of the current frame is lower than that of the past signal (step S63). Here, $\alpha$ps is a coefficient which has a value not larger than 1.0 and giving a margin to the average and which is provided for determining a threshold. When the condition is satisfied, a candidate for score correction is set. When the condition is not satisfied, processing is terminated without score correction. Then, the speech score SS of the current frame is compared with SSave to check whether SS<$\beta$ss×SSave is true, that is, whether the speech score of the current frame is lower than that of the past signal (step S64). Here, $\beta$ss is a coefficient which has a value not larger than 1.0 and giving a margin to the average and which is provided for determining a threshold. When the condition is satisfied, a candidate for score correction is set. When the condition is not satisfied, processing is terminated without score correction.

Further, a ratio of the number Nss of corresponding frames in sections of past N frames is checked based on whether Nss<$\gamma$ss×N is true (step S65). Here, $\gamma$ss is a coefficient which is a threshold indicating the ratio of corresponding frames and which is not larger than 1.0. This is a condition for relaxing correction of amplifying the speech score by mistake continuously when both power value and speech score are low in a section in which a time of a gap between speaking and speaking in a conversation is relatively long. When the condition is satisfied (i.e. when the gap of a conversation is short), a candidate for score correction is set. When the condition is not satisfied, processing is terminated without score correction. Each frame satisfying the condition is subjected to a score correction process of the score corrector 87a as a second half portion in FIG. 6 as follows.

First, a base speech score SSb is calculated to determine a score value to be corrected (step S66). The base speech score SSb is calculated as an average score of frames satisfying SS$\geq \beta$ssb×SSave in past N frames so that the base speech score SSb is set as a value based on the speech score of a speaking section. Here, $\beta$ssb is a value which is not larger than 1.0 and which gives a margin to the average. Then, the speech score SS is updated to the correction value (step S67). Although FIG. 6 shows the case where SSb is directly used as the correction value, it may be used a method which uses a predetermined fixed high score value, a past nearest value not smaller than SSb or a value (which is clipped so that the value after addition is not larger than the allowable maximum of SS) obtained by adding the correction value so that SS is set to be not smaller than a rated value.

According to the aforementioned embodiment, score correction is performed in consideration of the power value of the input signal and the score (similarity) in accordance with each sound type when an audio signal is subjected to discrimination between speech and music, and sound quality control is performed in accordance with a corrected result, so that improvement in followability of sound control (for a conversation scene or the like) and improvement in sound quality can be attained when signal characteristic changes.

In this manner, a characteristic of the input signal is analyzed to detect similarity to speech or music and calculate each score so that power value-interlock score correction is performed in accordance with power values and detected scores of past input signals when the signal power is low and the detected score is high. In addition, sound quality control suitable for a signal characteristic is performed based on the score. In this manner, followability of sound control (for a conversation scene or the like) is improved when the music score increases in excessive response to weak BGM or background sound in a gap of a conversation in a drama, etc. so that signal characteristic changes in accordance with the increase in music score. In addition, the detected score agrees with subjective impression easily when the detected score is visualized.

(Points of the Embodiment)

(1) For score determination by analyzing a characteristic of an input audio signal to detect similarity to speech or music, power value-interlock score correction is performed in accordance with power values and detected scores of past input signals when signal power is low. In addition, sound quality control suitable for a signal characteristic is performed based on the score.

(2) The method of determining applicability of music score correction is based on a condition that the power value of the current signal is not larger than a threshold based on the power average of past signals for a predetermined time, and the score of the current signal is not smaller than a threshold based on the score average of the past signals for the predetermined time. A condition that a section satisfying the condition is not smaller than a threshold in the predetermined time may be added in order to remove the influence of lowering of power for a short time in a music section.

(3) In the method of music score correction, a signal satisfying the applied condition is set to have a score obtained subtracting a predetermined correction value from an average score of other sections, a predetermined score, a past nearest score of other sections or the current score.

(4) The method of determining applicability of speech score correction is based on a condition that the power value of the current signal is not larger than a threshold based on the power average of past signals for a predetermined time, and the score of the current signal is not larger than a threshold based on the score average of the past signals for the predetermined time. A condition that a section satisfying the condition is not larger than a threshold in the predetermined time may be added in consideration of continuity of scores for a short time in a speech section.

(5) In the method of speech score correction, a signal satisfying the applied condition is set to have a score obtained by adding a predetermined correction value to an average score of other sections, a predetermined score, a past nearest score of other sections or the current score.

Incidentally, the invention is not limited to the aforementioned embodiment but may be modified variously without departing from the scope of the invention. For example, values of respective coefficients may be changed, and configuration may be made so that experimentally set values are changed adaptively.

For example, some constituent elements may be removed from each embodiment, and constituent elements in different embodiments may be combined suitably.

What is claimed is:

1. A sound quality control apparatus, comprising:
   a characteristic parameter extractor configured to analyze a characteristic of an input audio signal to extract a characteristic parameter;
   a speech score calculator configured to calculate a speech score indicating similarity to a speech signal characteristic, from the extracted characteristic parameter;
   a music score calculator configured to calculate a music score indicating similarity to a music signal characteristic, from the extracted characteristic parameter;
   a power value acquisition module configured to acquire a power of the input audio signal as a power value;
   a first storage configured to store speech scores and music scores in past predetermined sections;
   a second storage configured to store power values in the past predetermined sections;
   a power-based score corrector configured to correct a current music score or a current speech score based on
      a first comparison result between a current power value and past power values,
      a second comparison result between the current music score and past music scores and
      a third comparison result between the current speech score and past speech scores; and
   a sound quality controller configured to perform a sound quality control for the input audio signal by using at least one of the speech score and the music score corrected by the power-based score corrector.

2. The apparatus of claim 1,
   wherein a condition for applying a music score correction in the power-based score corrector is that the current power value is not larger than an average-based threshold of power values of past signals for a predetermined time, and that the current music score is not smaller than an average-based threshold of scores of the past signals for the predetermined time.

3. The apparatus of claim 2,
   wherein the music score correction is applied when a section satisfying the condition is not smaller than a threshold in the predetermined time.

4. The apparatus of claim 1,
   wherein the power-based score corrector performs music score correction so as to set a signal to have a score obtained by subtracting a predetermined correction value from an average score of other sections, a predetermined score, a past nearest score of other sections or the current score.

5. The apparatus of claim 1,
   wherein a condition for applying a speech score correction in the power-based score corrector is that the current power value is not larger than an average-based threshold of power values of past signals for a predetermined time, and that the current signal score is not larger than an average-based threshold of scores of the past signals for the predetermined time.

6. The apparatus of claim 5,
   wherein the speech score correction is applied when a section satisfying the condition is not larger than a threshold in the predetermined time.

7. The apparatus of claim 1,
   wherein the power-based score corrector performs speech score correction so as to set a signal to have a score obtained by adding a predetermined correction value to an average score of other sections, a predetermined score, a past nearest score of other sections or the current score.

8. A sound quality control method, comprising:
   analyzing a characteristic of an input audio signal to extract a characteristic parameter;
   calculating a speech score indicating similarity to a speech signal characteristic, from the extracted characteristic parameter;
   calculating a music score indicating similarity to a music signal characteristic, from the extracted characteristic parameter;
   acquiring a power of the input audio signal as a power value;
   storing speech scores and music scores in past predetermined sections;
   storing power values in the past predetermined sections;
   correcting a current music score or a current speech score based on
      a first comparison result between a current power value and past power values,
      a second comparison result between the current music score and past music scores and
      a third comparison result between the current speech score and past speech scores; and
   performing a sound quality control for the input audio signal by using at least one of the speech score and the music score corrected by the power-based score corrector.

* * * * *